March 29, 1966  W. L. AVES, JR  3,243,313
HEAT-RESISTANT ARTICLE
Filed April 25, 1960  2 Sheets-Sheet 2

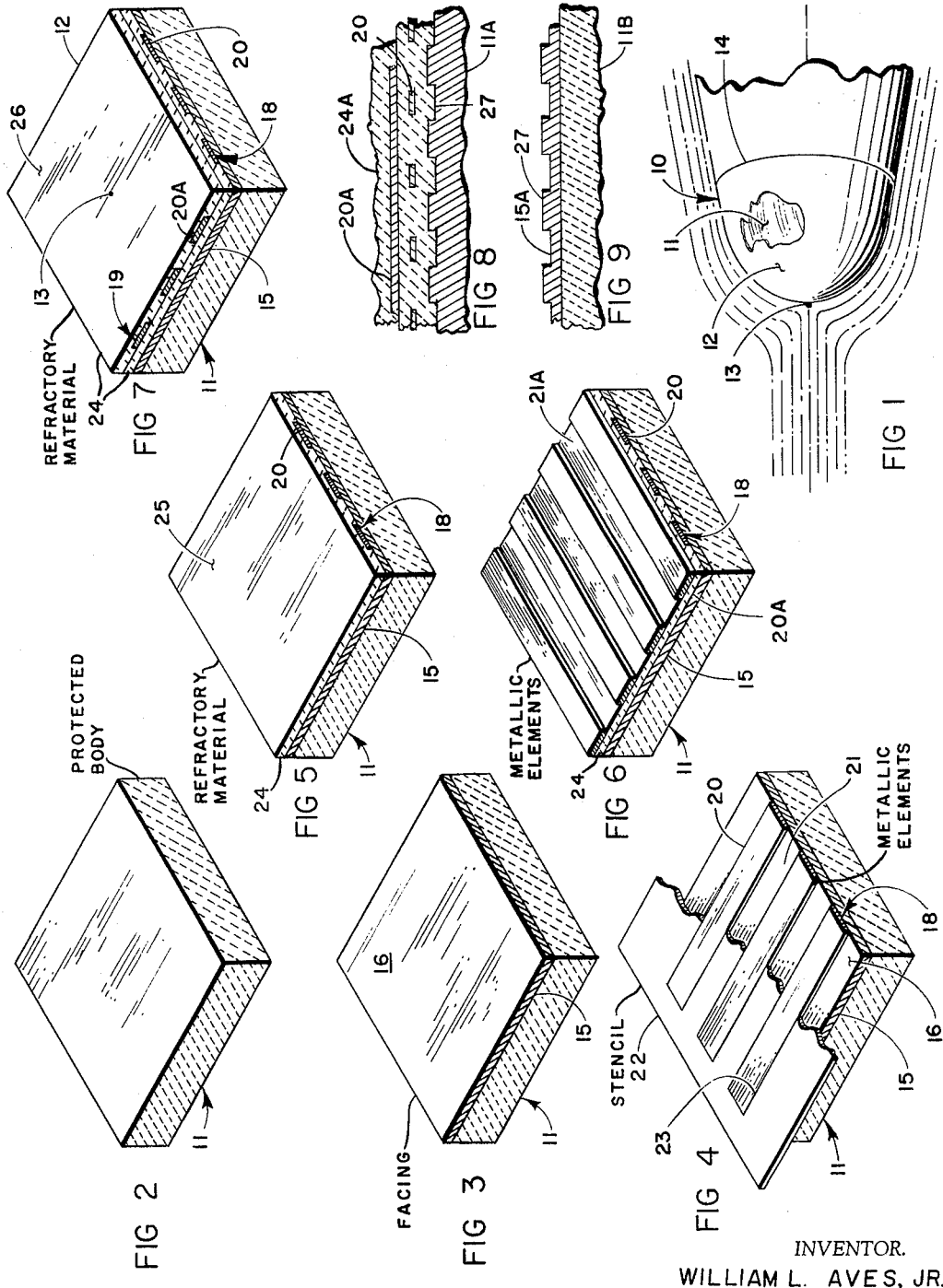

INVENTOR.
WILLIAM L. AVES, JR.
BY H.C. Goldwire
AGENT

United States Patent Office 3,243,313
Patented Mar. 29, 1966

3,243,313
HEAT-RESISTANT ARTICLE
William L. Aves, Jr., Arlington, Tex., assignor, by mesne assignments, to Ling-Temco-Vought, Inc., Dallas, Tex., a corporation of Delaware
Filed Apr. 25, 1960, Ser. No. 24,568
11 Claims. (Cl. 117—38)

This invention relates to heat-resistant articles and more particularly to means protecting a base material from deleterious effects of heat.

There has long existed the need for a coating which will protect a base material from oxidation and erosion while exposed to a very hot gaseous fluid and which itself is mechanically and chemically able to withstand high temperatures and protect the base material from thermal shock while itself withstanding rapid and extensive changes in temperature. Such a coating, if provided, would be of much value when employed as a high temperature furnace lining, a protective covering for a heat treating rack or a thermocouple, a lining for a rocket nozzle, etc. Further, the astronautical art finds as one of its major limitations, in a re-entry vehicle, the lack of an adequate means for the protection of nose cones and leading edges upon the return of a vehicle into the atmosphere. Both for older as well as for more recently evolved needs, investigators have explored the possibilities of ceramic materials to serve as protective media. Though of great value where temperatures are high, ceramic coatings have not been completely satisfactory under more severe operating conditions such as where high temperatures are combined with severe errosive conditions and where extremely wide temperature changes occur very quickly.

In the search for a more adequate coating, it was sought to provide a multi-layer protective coating, a sandwich made up of plural, alternating coats of metal and ceramic. These coatings have been of value for protecting articles including re-entry nose cones, rocket blast deflectors, and rocket motor exhaust nozzle components and have successfully withstood extended runs at temperatures ranging from 2000° F. to 2800° F. and short runs from 3200° F. to 4500° F. The coatings are versatile in that they are readily adapted for the protection of such diverse materials as ceramics, graphite, and the refractory metals, molybdenum, columbium, tungsten, tantalum, etc. and their alloys. Multilayer coatings, however, have the serious disadvantage of poor resistance to rapid cooling and are not satisfactory where, as in a skip-glide re-entry vehicle, rapid and repeated heating and cooling is encountered; for a delamination and loss of an outer layer or layers tends to accompany or follow each cooling.

The chief cause of failure of a multi-layer coating by delamination seems to lie in the disparity between the thermal coefficient of contraction of the metallic layers as opposed to that of the ceramic layers, and the different contraction rates upon rapid cooling set up stresses which result in disruption of the interfacial bond between the two materials. A brief consideration of the structural features of the laminated coating which render it prone to delamination will be helpful in understanding both the problem involved and, where it is presented in later paragraphs, the operation of the present invention.

For maintaining its structural integrity, each metallic layer of a multi-layer coating must remain rigidly fixed relative to the adjoining ceramic layer or layers. Since its thickness is quite small relative to its area, the effect of the edges of a metallic lamination in maintaining this relationship is entirely negligible and the metallic layer must depend altogether on the restraint imposed by the interface bond between itself and a ceramic layer. The metallic coat and ceramic coat are generally parallel; hence, the forces engendered at the interface by differences in contraction rates are forces in shear. Where more than a very small object is protected by the coating, each metallic coat has a considerable lengthwise as will as crosswise dimension; hence, the cumulative extent of its contraction upon cooling is large in more than one direction. The interface forms a cleavage plane at which the metal and ceramic separate when shear forces on the bond between them become too great. Whereas shear force in a given direction or in a second direction, in the cleavage plane, normal to the first may never become great enough to break the bond, the vectorial sum of those forces may be more than enough, at a given point, to effect the breakage. Both the metals and the ceramics employed in such constructions have a degree of elasticity and can absorb and withstand some loads urging their relative motion at the interface; as long as no point in the interface bond is overstressed, all is well. When the bond is overstressed at some point, however, and locally broken, the break progresses throughout much or all the remainder of the interface, and partial to substantially complete delamination occurs.

In an attempt to reduce delamination, it has been proposed to vary the relative thicknesses of the metallic and ceramic laminations in a multilayer coating to make the initial layers more compatible with the coefficient of contraction of the protected body and the outer layers with that of the ceramic employed. Thus, in the inner layers, the metal coats are relatively quite thick and the ceramic coats thin; and this relationship is progressively varied until, in the outer layers, it is reversed. This construction has not ended delamination, but it has somewhat reduced it. The advantages of the gradated construction are obtained, however, only at cost of much complication and increased complexity of design and fabrication because of the need for determining and specifying the optimum thickness of each of the layers and then of producing each layer, within satisfactorily close tolerances, to its individually specified thickness. Since a dozen or more individual coats are often employed, the cost of the finished article is increased, while reliability of operation of the product is apt to be decreased because of the manifolded likelihood of error in correctly specifying and producing the numerous, different thicknesses.

In a relatively large object which is provided with multiple, alternating layers of metal and ceramic and to which heat is applied in a localized area, the metal layers are somewhat helpful in conducting heat away from the area of its application to cooler areas and thus in preventing rapid strike-through of heat, in the localized area, to the body protected. Because of the presence of the sheets or coats of metal, however, the amount of ceramic per unit volume of the multi-layer coating is reduced and the weight is increased in comparison to an equal unit volume composed entirely of ceramic. Where the coated object is small compared to the heat source and the whole area of the coating is heated thereby, the metallic coats offer no advantage in conducting heat away, for they extend into no cooler place into which the heat may be dissipated. Furthermore, since they are much better conductors of heat than the ceramic, they are here a positive disadvantage since they implement considerably faster strike-through of the heat than would occur were the coating made entirely of an equal, overall volume of ceramic. Meanwhile, the interfaces of each metallic coating are potential cleavage planes and are not as satisfactory as would be desired for strengthening a multi-layer coating totally immersed in great heat.

Accordingly, it is highly desirable to provide a heat-resistant article capable of enduring higher temperatures and more extreme thermal shock than can be withstood by previous articles and to provide, for such an article, a heat-protective means which is not subject to the delamination which is the greatest defect in protective coatings made up of alternate layers of metal and a non-metallic refractory.

It is, therefore, a major object of the present invention to provide a composite coating employing a plurality of materials for the protection of a base material from the injurious effects of high temperatures.

Another object is to provide a heat-protective coating which is of improved resistance to the shock of rapid and extensive changes in temperature and which can withstand single or repeated cycles of heating and cooling without delamination.

A further object is to provide a protective coating making possible the repeated exit from and entry into and passage through the atmosphere by a vehicle at orbital and near-orbital speeds.

Yet another object is to provide an improved heat-protective coating suitable for the nose cones and leading edges of vehicles moving through a fluid medium at very high speeds.

A still further object is to provide a heat-protective coating in which gradation of the thickness of layers is not necessary for preventing spalling or delamination and in which the respective thicknesses of layers is of lessened criticality.

Still another object is to provide a coating of lighter weight, per unit volume, than typical multi-layer coatings but stronger and of increased insulating capability over the latter when part or substantially all the coating is immersed in great heat.

An additional object is to provide a multi-material, composite coating in which the strength with which the materials are retained in fixed relation to each other exceeds the strength of bonds at interfaces between coats of a multi-layer coating.

Another object is to provide a novel construction for varying the coefficient of contraction of a coating to approximate, at inner layers thereof, the coefficient of contraction of the body protected thereby and, at its outer layers, the coefficient of contraction possessed by one of the materials when employed alone.

Other objects and advantages will be apparent from the specification and claims and from the accompanying drawing illustrative of the invention.

In the drawing,

FIGURE 1 is a perspective view of a nose cone protected according to the present invention;

FIGURES 2 through 7 are diagrammatic perspective views of a portion of the nose cone and of the successively applied materials forming a protective coating on the same;

FIGURE 8 is a diagrammatic, sectional view of a metallic body to which the protective coating has been applied;

FIGURE 9 is illustrative of a form of coating defining the exterior surface of a graphite body to which the remainder of the heat-protective means is yet to be applied;

FIGURE 11 shows a second grid added to the first while

Figure 10:
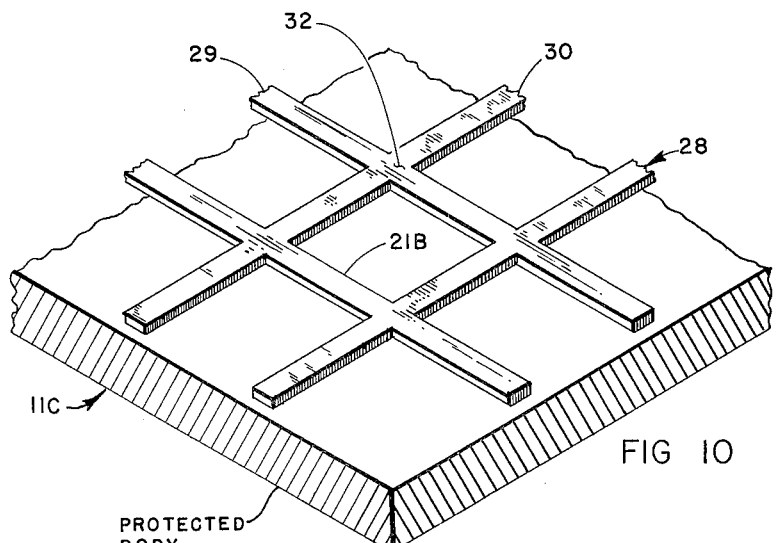
FIGURE 10 shows a metallic body and a grid overlying the same.

With initial reference to FIGURE 1, an article such as a missile nose cone 10 is immersed in a relative flow of gases which move very rapidly and subject the nose cone to intense heat. The nose cone comprises a protected body 11 formed of a base material such as a metallic or non-metallic refractory or a cermet or even a plastic having necessary qualities such as adequate strength at relatively high temperatures. Molybdenum, columbium, tungsten, and tantalum and their alloys are representative of refractory metals. Among the non-metallic refractories may be mentioned high-density graphite, ceramic materials, and plastic materials, the term "ceramic" being employed consistently herein in its sense denoting a material, or a body made of a material, including one or more of the refractory oxides, carbides, nitrides, or borides of a metal and whether or not fused after the body is formed. To insulate the base material 11 from the full brunt of the temperatures which must be endured, for example, upon re-entry into the atmosphere, and to protect it from oxidation and erosion as well as to slow the rate of unavoidable changes in temperature and thus protect it from thermal shock (this term being employed herein to denote the imposition of stresses within a material by very rapid cooling from a high temperature as well as by very rapid heating from a lower temperature), the body 10 is provided with a protective coating 12 which covers and shields the same. The area of the body 10 exposed most strongly to heat is that at and immediately adjoining the stagnation point 13 in the airflow thereagainst, while other areas, for instance those toward the skirt 14 of the nose cone, are less strongly exposed to heat during useage. It will be understood that a nose cone 10 is shown only by way of example and that an airfoil leading edge or other upstream portion of a body immersed during use in a hot, fast-moving flow is benefitted by application of the coating as is also a body immersed for short or long times in a still, very hot fluid.

FIGURES 2 through 7 show one form of the heat-resistant article and is typical of various stages of the construction of a fragment of the nose cone 10 of FIGURE 1. Though the article is shown flat, this is for promoting ease of representation and understanding of the construction, and the construction shown is bent and curved wherever needed for forming a leading edge, nose cone, etc. To take an example where the base material of the protected body 11 (FIGURE 2) is graphite or another material of such nature that a non-metallic refractory material applied thereto will not make an entirely satisfactory bonded contact with the same, the base material is provided, as shown in FIGURE 3, with a layer 15 whose outer surface then defines the exterior surface 16 of the composite body (protected body 11 and layer 15) thus formed and which bonds readily and well to a non-metallic refractory. Such a facing or layer 15 forming the exterior of the body 11 may be, for example, a metal identical with or with characteristics approximating those of the metallic elements described in later paragraphs, and molybdenum is specified by way of preferred example. The outer layer 15 of the body 11 may be applied by electrodeposition, dipping in molten metal, etc.

According to a preferred mode of application, however, the protected body 11 is cleaned with a solvent to remove dirt and grease and is roughened with a nickel-chromium or stainless steel brush to produce round-bottom grooves of the order of 0.002 inch in the graphite. After removing loose dust with an air blast, a layer of molybdenum is flame-sprayed on the prepared graphite surface with a metallizing gun. The resulting coating or layer 15, laid down in discrete particles, is somewhat porous and bonds intimately and strongly with the graphite 11 which it covers. The outer surface 16 of the molybdenum layer 15 is the exterior surface of the composite body 11 formed jointly by the layer 15 and protected body 11 and because of its metallic and porous nature bonds excellently with the items applied to it as described below.

Over the metallic layer 15 are superposed metallic elements 20, 20A (FIGURES 4 and 6) which overlie the exterior surface 16 of the protected body 11. These elements are spaced from each other along the exterior surface 16 and also, as shown in FIGURES 6 and 7, outwardly from that surface. This relationship is obtained, for example, where the metallic elements 20, 20A are applied in strata, with a first plurality of elements 20 spaced from each other in one stratum 18 and a second plurality of elements 20A spaced from each other in a stratum 19 (FIGURE 7) overlying the first. The metallic elements 20, 20A preferably are in the form of strips, i.e., relatively long, narrow, and thin pieces of metal whose broader faces, as contrasted with their edges, are generally parallel to the exterior surface 16 which they overlie. The first plurality of strips 20 are all disposed at approximately the same distance from the body exterior surface 16, and this distance may be diminished to zero, as shown in FIGURE 4 wherein the metallic strips are bonded directly on the body layer 15. In all cases, the strips 20 are mutually spaced to define interstices 21 (FIGURE 4) therebetween, and it will become evident that advantages accrue to arrangement of the first plurality of elements 20 in a predetermined pattern wherein they extend preponderantly in one direction, an example being shown in FIGURE 4 wherein the elements 20 are parallel.

The first plurality of metallic elements 20 may be, as stated above, spaced from or laid directly on the exterior surface 16, and where the latter is the case they are strongly affixed to the surface. According to a preferred method, a configurated, patterned mask 22 (FIGURE 4) is provided in form of a stencil made of stainless steel or other suitable material cut or etched to provide openings 23 corresponding to desired strips 20 to be laid down on the body exterior surface. With the stencil 22 positioned on the surface 16 as shown in FIGURE 4, a metal, for example molybdenum, is flame-sprayed into the openings to produce the plurality of strips 20 of desired thickness. While not ordinarily critical, a thickness of 0.002 to 0.005 inch is representative. Since metallizing technics by flame-spraying are well known, as is similar use of this method for laying down a metallic oxide on a surface, detailed description of the spraying on of the metallic elements 20 (or of the ceramic or other non-metallic refractory material which covers them) will not be necessary herein. As to the material of which the elements 20, 20A are made, however, other of the refractory metals than molybdenum may be employed, and tungsten or tantalum are suitable where the temperatures to be withstood exceed even those which can be successfully borne by molybdenum. The elements 20, 20A are preferably made of the same material as the layer 15 forming the body outer surface 16 where, as described, this is of metal. In each case, the metal employed is preferably a better conductor of heat than the non-metallic refractory material 24 which, as will be described, covers it; it should be strong at high temperatures, not subject to thermal shock, and bondable with good strength to the materials with which, as herein described, it is in contact. Flame-sprayed as described on the body exterior surface 16, the first plurality of metallic elements 20 bond firmly to the latter, the bonding being enhanced by the mechanical interlocking which occurs as the particles of sprayed, molten metal attach to the pores and roughness of the surface 16 onto which they are applied. It will be noted that where the elements 20 are applied directly to the body exterior surface 16, they form, in effect, raised portions of the surface 16.

The second plurality of metallic elements 20A (FIGURES 6, 7), spaced outwardly from the first elements 20, similarly are preferably formed of strips whose faces are generally parallel with the body outer surface 16 and all positioned approximately the same distance therefrom. The strips 20A of this second stratum 19 are arranged in a predetermined pattern in which they are mutually spaced from each other to define interstices 21A therebetween, and it is characteristic that substantially all of them lie at least partly out of register with all the first plurality of elements 20 (it being meant, by this, that substantially none of the ones of the second plurality of elements 20A lie parallel with and directly over corresponding ones of the first plurality of elongated, metallic elements 20). Their thickness is of the same order as that of the first plurality of metallic elements 20. FIGURE 6 shows that the second plurality of elements 20A extend preponderantly in a direction which crosses the preponderant direction of extension of the first set or layer of metallic elements 20; hence, the second-layer elements 20A lie in crossed relation with the first-layer elements 20.

A non-metallic refractory material 24 (FIGURE 7) covers the first and second pluralities of metallic elements 20, 20A in intimate, bonded contact with substantially all the surface areas thereof and extends through the interstices therebetween into covering, bonded contact with the body exterior surface 16. Two exemplary materials for this use include alumina ($Al_2O_3$) and zirconia ($ZrO_2$). Both materials are readily available for use; both may be employed in rod or powdered form for flame-spraying, and their ability to withstand severe thermal shock, vibration, and erosion has been proven. Alumina generally is superior to zirconia in withstanding high-velocity gas erosion; where its melting point of approximately 3700° F. limits its use, zirconia (whose melting point is at about 4800° F.) is recommended. The non-metallic refractory material 24 may be applied in several ways; for example, it may be molded or cast in place and baked. By a preferred method, however, the non-metallic material 24 is applied in a manner ensuring good bonding and yielding a product which is porous and thereby of excellent strength in shear, compression, and tension and yet of optimum lightness.

According to this method, the stencil 22 (FIGURE 4) is removed after providing the first plurality of metallic elements 20 and they and the remaining exposed parts of the body exterior surface 16 are flame-sprayed with the chosen metallic oxide until the sprayed material has covered and bonded to the exterior surface and the edges and faces of the metallic strips 20. The interstices 21 between the strips 20 preferably are filled by the sprayed material, and a surface 25 (FIGURE 5) is built up which lies above the first plurality of strips. A suitable stencil 22 is positioned on this oxide surface 25 and the second plurality of metallic strips 20A (FIGURE 6) is laid down on the oxide surface by flame-spraying as described. Next, the stencil is removed and the second plurality of metallic elements 20A and the oxide surface 25 on which they are laid are flame-sprayed with a metallic oxide until the interstices therebetween are filled and an outer surface 26 (FIGURE 7) is built up which lies outside the second plurality of strips 20A. A representative extension above the metallic elements is 0.002 to 0.010 inch. The resulting ceramic coating 24 may all be made of one metallic oxide, or one oxide may be employed next to the body outer surface 16 and another used to form the exterior surface 26 of the ceramic coating. In the same manner, one metal may be employed in the first stratum of strips 20 and another metal in the other strips 20A. While only two stratified pluralities of metallic elements 20, 20A have been shown, it will be understood that as many more strata of metallic elements as desired may be added, together with a non-metallic refractory enclosing them, by employing the method outlined above or by use of any convenient method. In any event, for obtaining the full advantages of the invention, it is important that the strips 20 or 20A forming each stratum of metallic elements be arranged as described and that they lie out of register with the elements of immediately adjoining strata. Further, where the heat-resistant body is exposed most strongly to heat in a particular area, for example at a stagnation point in a flow, metallic elements 20, 20A must traverse this area and extend therefrom to less strongly heated areas.

Whereas the metallic elements 20, 20A (FIGURES 6–7) of each stratum have been shown parallel with each other, the predetermined pattern in which they are laid may vary from this relationship and indeed will often do so. It will be understood, for example, that since the elements 20, 20A shown in FIGURES 6, 7 underlie the stagnation point 13 (FIGURES 1, 7) and since substantially all of them must extend therefrom with unbroken thermal continuity to cooler areas near the skirt 14 (FIGURE 1) of the nose cone, the strips 20 or 20A extending longitudinally of the nose cone must diverge as they extend rearwardly from the tip toward the skirt 14 of the cone. The strips 20 or 20A running in crossing direction exist as rings which encircle the protected nose cone body 11, and the spacing between them preferably is increased toward the skirt 14 of the nose cone. Thus, in the particular example shown, there is a larger ratio of metal to ceramic at the nose and a lower one at the skirt 14 of the nose cone. Where the spacing between longitudinally extending strips 20 or 20A tends to become wider than desired toward the skirt 14 of the nose cone, added strips may be located in the interstices between them, which added strips should extend forwardly from the nose cone skirt 14 a fraction of the distance separating the latter from the stagnation point 13. For best results, it is desirable that the added metallic strips be brought, at their forward ends, into thermally conductive contact with the longer strips between which they are introduced, and this is to give them thermal continuity with the area including the stagnation point 13.

Where the base material of the body 11A (FIGURE 8) to be protected is a ceramic, a metal, or other material to which the non-metallic refractory material will bond strongly, its exterior surface preferably is provided with raised portions 27 integral with the base material and which extend upwardly into the applied non-metallic refractory material 24A. The raised portions 27 interdigitate with downwardly extending portions of the non-metallic refractory material 24A and augment the bonding strength of the latter with the base material by affording the added mechanical strength of a tongue-and-groove construction. Note that the first plurality of metallic elements 20 need not rest on the body exterior surface but may, as shown, be spaced upwardly from the latter. One of a second plurality of metallic elements is shown at 20A.

FIGURE 9 shows a form of the body to be protected in which the exterior surface is formed by a metal facing 15A applied to a graphite base material 11B and in which facing grooves have been formed to leave portions 27 which will extend upwardly into a ceramic or other non-metallic material when the latter is applied thereto through the interstices of spaced metallic elements (not shown) with as described herein.

A modified form of the metallic elements is shown in FIGURE 10. Whereas, by definition, the metallic elements 20, 20A in each stratum 18 or 19 shown in FIGURES 2–7 together form an arrangement of elements properly designated as a "grid," FIGURE 10 shows a grid 28 comprising not only parallel elements 29 running in one direction but also other elements 30 continuous therewith and extending crosswise thereto. The plurality of metallic elements 29, 30 of one stratum hence, in this modification, are interconnected and define interstices in the form of openings 21B therebetween.

The grid 28 overlies the surface of the body 11C to be protected and is directly bonded thereto or, as shown, is spaced outwardly therefrom in generally parallel relation with the same. The second grid 31 (FIGURE 11) overlaps the first and is positioned in such manner that substantially all its interstices 21C are, at least to a considerable degree, out of register with the interstices 21B of the first grid 28. This relationship is achieved by varying the size or pattern of the interstices 21C in the second grid 31 or, as shown, by so positioning the grid 31 that its members are offset from corresponding members of the first grid 28; thus, in the example, the intersections 32 of members 29, 30 of the first grid are in register with the centers of the openings 21C of the second grid. It will be noted that the second grid 31 is shown as containing members substantially parallel to and spaced above the members 30 of the first grid 28.

Upon bringing the third and successive grids into place, the out-of-register relation of the interstices of immediately adjoining grids is preserved, and the interstices of even non-adjoining grids are thrown out of register insofar as is expedient. Where the grids overlie curved or irregular surfaces, their openings equivalent to 21B, 21C will often be thrown adequately out of register by the variations of the grids from a flat plane as necessary in bringing them into evenly spaced relation with the surface of the body, typified by 11C, which they overlie. Where the grids overlie a flat surface, continued variation of the spacing of their interstices such as 21B, 21C may be accomplished by use of a number of plans. To provide an illustration, the corner portions 33, 34, 35, 36 (FIGURE 11) of four interstices 21B of the first grid 28 are in register with one representative opening of the second grid 31. The third grid 37 (FIGURE 12) is positioned so that one of its intersections 38 occurs in register with the opening portion 33, its other intersections of course coinciding with other, similar opening-portions. A fourth grid (not shown) may be positioned with an intersection in register with the opening portion 34, a fifth with the portion 35, etc.

Figure 12:
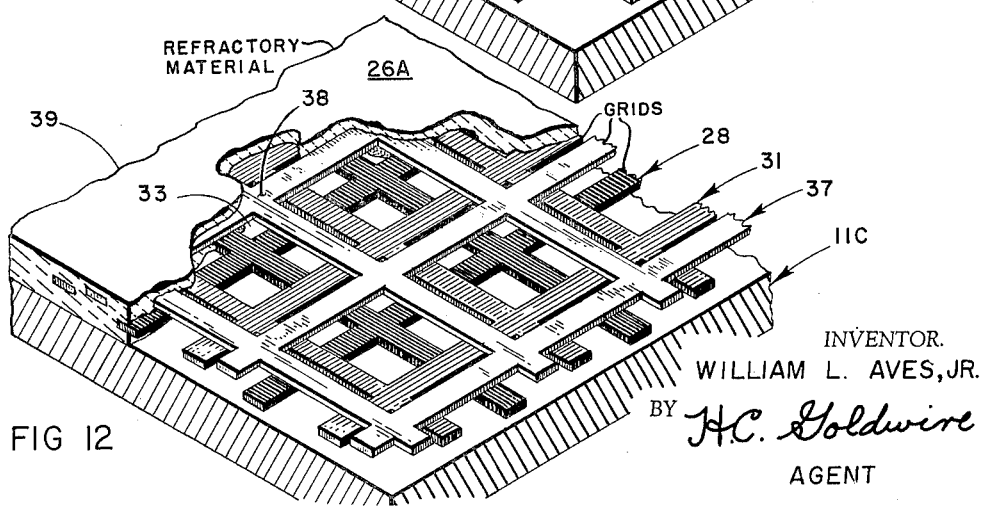
FIGURE 12 shows a third grid in place and a non-metallic refractory material covering the grids and metallic body.

The non-metallic refractory material 39 covering the metallic grids, typified by 28, 31, 37, in intimate, bonded contact with substantially all the face and edge areas thereof is shown in partial view in FIGURE 12 and extends, as before, through the interstices of the grids and into covering, bonded contact with the exterior surface of the body 11C protected. This material 39, as it does in the case of the metallic elements shown at 18, 19 in FIGURE 7, covers the grids 28, 31, 37 where they overlap each other and the body exterior surface and preferably has an outer surface 26A disposed outwardly of the outermost metallic grid. Where one area is most strongly exposed to heat, as where it includes a stagnation point, the grids and the non-metallic refractory material cover this area and extend therefrom to areas less strongly exposed to heat, for example, areas more remote from the stagnation point.

Figure 11:
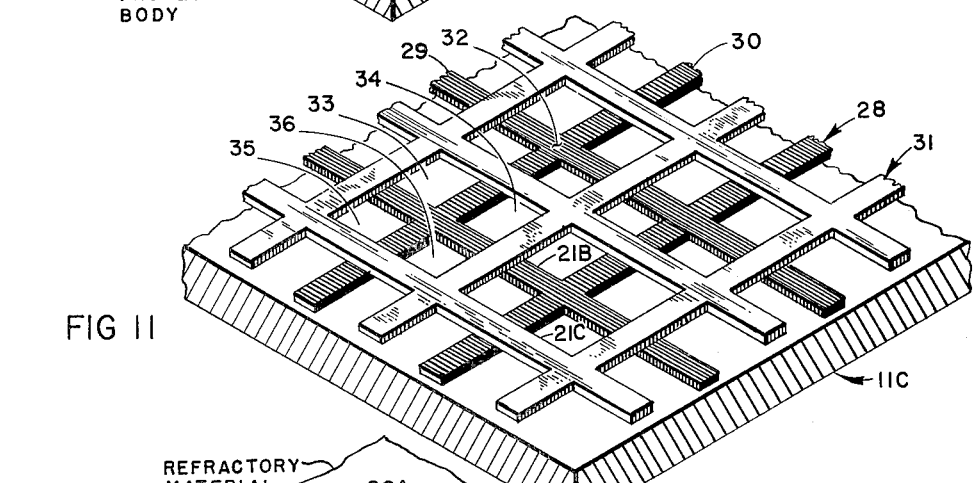

Fabrication of the construction shown in FIGURES 10–12 preferably is accomplished by the method described in connection with FIGURES 2–7. While it is within the art, after having become acquainted with the foregoing information, to provide a stencil by means of which the pattern of the grids of FIGURE 10 may be flame-sprayed on the body 11C to be protected or on a ceramic or metallic coating first flame-sprayed on the exterior surface of the body 11C, an alternate method is to mask the surface by hand where the interstices of the grid are to occur before flame-spraying. According to another method, the surface of the body 11C is sprayed with a masking material through a stencil that covers the surface where the longitudinal and cross-members of the grid 28 are to occur. After removing the stencil, the masked surface is flame-sprayed with molten metal to produce the grid 28, whereupon the masking material is removed and the interstices of the grid 28 filled and its members covered with a flame-sprayed non-metallic refractory 39. As many more grids and layers of non-metallic refractory material as required are applied in the same manner to build up, over the body 11C to be protected, a protective means of desired thickness.

When an object provided with the protective means 12 shown in FIGURES 1 and 7 or with the modifications thereof shown in the other figures is small relative to the heat source and is abruptly exposed to the latter, a longer time is required for the heat to strike through the thickness of the protective means 12 than would be the case in a coating of same unit volume or weight and made of alternate metallic and non-metallic coatings, and the protected body thus can be subjected to the heat source for longer times without rising to a temperature equal to that of the outer surface of the protective means. Factors of importance in accomplishing this most favorable result include the use of the spaced metallic elements described which provide, in a unit volume, more ceramic and less metal. As thermal conductivity in the ceramic is lower than in the metal, the present coating is a better insulator and better slows the passage therethrough of heat. Of especial importance in this regard is the out-of-register location, in all cases, of the metallic elements such as 28, 31, 37 and the crossed elements 20, 20A: if the elements 20, 20A, for example, of FIGURE 7 were parallel and stacked one above the other (rather than out of register as shown), heat passing through the non-metallic refractory 24 into a strip 20A would pass quickly through the latter and directly downwardly into an underlying, parallel strip 20, hence directly into the body 11 sought to be protected. The result, then, of each stock of in-register strips 20, 20A would be a localized strike-through of heat in an area defined by the particular in-register strips 20, 20A. Since the strips 20, 20A are spaced and crossed, however, heat which flows from the outer surface 26 of the protective means and directly downward through the latter into the protected body 11 is not significantly aided by passage through metal 20 or 20A and is slowed by the enforced passage through more non-metallic refractory material 24. The strip 20 does underlie the strip 20A in the area where they cross, but this area is small, and the rest of the metal of the lower strip 20 quickly shares and draws away the greater heat which otherwise would pass through at this point. The construction shown, therefore, prevents localized strikethrough of heat and is conducive to uniformity of temperature over the surface of the body 11 protected as well as in the protective coating 12. The present construction is not only of better insulating capability because it contains less metal and more of the porous ceramic but for the same reason is lighter in weight than a coating of equal volume and composed of alternate layers of metal and ceramic, an advantage of critical value especially in aircraft including atmospheric entry vehicles.

When the heat-resistant article made as described herein is very quickly heated or cooled, it is not subject to the delamination which occurs, particularly upon rapid cooling, in a system made up of alternate layers of metal and ceramic. No continuous, metallic coating is present in the heat protective means; hence, there is no continuous metal-to-ceramic interface to form and act as a ready cleavage plane.

In addition, it will be noted that, upon cooling, a large sheet or coating of metal shrinks in more than one direction in the plane of its surface. Whereas the stresses set up in one given direction and in another direction normal thereto might not, either of them alone, be great enough to break an interface bond between a metallic coating and a non-metallic refractory coating, the resultant of the two forces may be amply large to shear the bond. The total shrinkage of a metallic sheet or coating in a given direction is related to the dimension of the sheet in that direction and increases or decreases as the dimension is increased or decreased. In the long, relatively narrow metallic elements 20, 20A (FIGURE 7) or 29, 30 (FIGURES 10-12) employed according the present invention, practically no significant forces in shear develop in the interface between the metallic element and ceramic except in a direction along the length of the element, for the total contraction of the metal, upon cooling, is small in a direction traversing the narrow width of the element. As a result, forces in shear are much smaller and are easier borne by the interface than where alternate metal-ceramic coatings are employed.

In addition, the ceramic contacting a given element 20, 20A or 29, 30 is not like a ceramic coating on a metallic layer, where all forces tending to move the metal relative to the ceramic must be borne by the interface, in that the element 20A (FIGURE 7), for example, is bonded to a ceramic body which, in effect, extends all around the metal in one continuous piece. Stresses in shear at the top and bottom faces of the element 20A or other element 20, 29, or 30 thus can be transmitted therefrom into the ceramic material interlying the element and adjacent elements and elastically absorbed by the continuous body of ceramic. In addition, the edges of the elements 20, 20A, 29, 30 are bonded to the ceramic, and these bonds bear a helpful share of the forces tending to slip the metal element along its length and relative to the ceramic. As a consequence, shearing of bonds between the metal elements and surrounding ceramic does not occur under conditions of repeated heating and cooling which would cause delamination in a construction made up of alternate layers of metal and ceramic. Thus, whereas a multilayer metal-ceramic coating will withstand only one cycle of heating and cooling of sufficient severity to cause its delamination, the present construction will withstand many cycles of equal and greater severity without being harmed.

Where the protected body is locally heated as by having a part of its area exposed more strongly to heat than other areas, the metallic elements receive heat which has come to them through the ceramic and are entirely adequate in conducting it away from the locally heated spot, for example the stagnation point 13 (FIGURES 1 and 7), to cooler portions of the coating, where it is dissipated into the non-metallic refractory material surrounding the metallic elements. The area lying immediately adjacent the stagnation point 13 thus is cooled. In addition, thermal gradients from area to area of the heat-resistant coating are kept at a minimum, thus increasing its resistance to cracking, spalling, and erosion.

Close-tolerance gradation of the thicknesses of alternate layers of ceramic and metal is resorted to in multilayer metal-ceramic coatings in order to make the inner layers more nearly of the same coefficient of contraction as the body they protect and that of the outer layers more nearly that of ceramic alone. In the present construction, however, the metallic elements 20, 20A and 29, 30 are very narrow as compared to an entire metallic coating, and they are entirely surrounded with the ceramic or other non-metallic refractory 24 or 39 except where, in some cases, they are contacted by the protected body. As a consequence of this construction, close-tolerance control of the thicknesses of the applications of metallic elements 20, 20A or 29, 30 and non-metallic refractory 24 or 39 is not necessary. Variation of the coefficient of contraction and also the conductivity of the coating is readily accomplished, however, by spacing the metallic elements closer together near the body to be protected and farther apart near the outer surface of the coating. When this arrangement is followed, advantage is taken of the greater insulating power of the non-metallic refractory 24 or 39 at the outer surface of the coating and the coefficient of contraction of the inner parts of the coating is made to more nearly approach that of the body protected.

While only one embodiment of the invention, together with several modifications thereof, has been described in detail herein and shown in the accompanying drawing, it will be evident that various further modifications are possible in the arrangement and construction of the components of the invention without departing from the scope thereof.

I claim:

1. In combination with a protected body having an exterior surface, a protective coating comprising elongated, solid, flame-sprayed metallic elements overlying said surface and spaced from each other both along and outwardly of said surface; and a ceramic material covering said metallic elements in intimate, bonded contact with the same and extending through the spaces between said elements into covering, bonded contact with said surface.

2. The combination set forth in claim 1, said body having an additional layer thereon whose outer surface is said exterior surface of said body.

3. The combination claimed in claim 1, said surface having raised portions extending into said ceramic material.

4. In combination with a protected body having an exterior surface, a protective coating comprising a plurality of elongated, solid, flame-sprayed metallic elements generally parallel to and overlying said surface at substantially the same distance therefrom, said elements being mutually spaced to define interstices therebetween; a second plurality of elongated metallic elements generally parallel to and overlying said surface at substantially the same distance therefrom, said second plurality of elements being spaced outwardly from and lying out of register with the first plurality of elements and mutually spaced from each other to define interstices therebetween; and a ceramic material covering all said metallic elements in intimate, bonded contact therewith and extending through the spaces therebetween into covering, bonded contact with said surface.

5. The combination claimed in claim 4, substantially all the second plurality of metallic elements lying in crossed relation with the first plurality of metallic elements.

6. The combination claimed in claim 4, said metallic elements comprising strips whose faces are generally parallel with said surface.

7. In combination with a protected body having an exterior surface, means applied to said surface for protecting the body from destructive effects of heat, said means comprising: a plurality of solid, flame-sprayed metallic strips generally parallel to and overlying said surface at substantially the same distance therefrom, said strips being arranged in a predetermined pattern and mutually spaced to define interstices therebetween, said strips extending preponderantly in one direction; a second plurality of metallic strips generally parallel to and overlying said surface at substantially the same distance therefrom, said second plurality of strips being spaced outwardly from the first plurality of strips, mutually spaced from each other to define interstices therebetween, and arranged in a predetermined pattern wherein they extend preponderantly in a direction which crosses the direction of preponderant extension of the first plurality of strips; and a ceramic material covering all said strips in intimate, bonded contact with substantially all the surface area thereof and extending through the spaces therebetween into covering, bonded contact with said surface.

8. In combination with a protected body having an exterior surface, means applied to said surface for protecting the body from destructive effects of heat, said means comprising: a plurality of flame-sprayed metallic grids lying in spaced, overlapping relationship with each other and with said surface of said body, each of said grids having interstices and at least the majority of the interstices of each grid being at least partly out of register with the interstices of each immediately adjoining grid; and a ceramic material covering the metallic grids and extending through the interstices thereof into bonding contact with said surface of said body and with substantially all the surface area of said grids where they overlap each other and said surface of said body.

9. The combination recited in claim 8, at least one of said grids comprising parallel elements and elements disposed crosswise of said parallel elements.

10. In combination with a protected body having an exterior surface which has an area exposed more strongly to heat and other areas exposed less strongly to heat during useage of said body, means for protecting said body from destructive effects of heat, said means comprising: a plurality of flame-sprayed metallic grids lying in spaced, overlapping relationship with each other and with said surface of said body, each of said grids having interstices and at least the majority of the interstices of each grid being at least partly out of register with the interstices of each immediately adjoining grid, said grids overlying said area more strongly and said areas less strongly exposed to heat; and a ceramic material covering the metallic grids and extending through the interstices thereof into bonding contact with said surface of said body and with substantially all the surface area of said grids where they overlap each other and said surface of said body.

11. In combination with a protected body having an upstream portion immersed during use in a hot, fast-moving flow, said portion having an exterior surface which has an area lying immediately adjacent a stagnation point in said flow and other areas more remote from the stagnation point: a plurality of flame-sprayed metallic grids having solid elements lying in spaced, overlapping relationship with each other and with said surface of said body, each of said grids having interstices and at least the majority of the interstices of each grid being at least partly out of register with the interstices of each immediately adjoining grid, said grids overlying the area lying immediately adjacent the stagnation point and the areas more remote from the stagnation point; and a ceramic material covering the metallic grids and extending through the interstices thereof into bonding contact with said surface of said body and with substantially all the surface area of said grids where they overlap each other and said surface of said body.

References Cited by the Examiner

UNITED STATES PATENTS

| | | | |
|---|---|---|---|
| 2,301,062 | 11/1942 | Long | 72—40 |
| 2,389,420 | 11/1945 | Deyrup | 75—22 |
| 2,588,421 | 3/1952 | Shephard | 117—71 |
| 2,835,107 | 5/1958 | Ward | 60—36.6 |
| 2,939,807 | 6/1960 | Needham | 117—212 |
| 3,031,331 | 4/1962 | Aves et al. | 117—46 |

RICHARD D. NEVIUS, *Primary Examiner.*

CARL F. KRAFFT, ALEXANDER WYMAN, H. L. GATEWOOD, R. S. KENDALL, *Assistant Examiners.*